United States Patent
An et al.

(10) Patent No.: US 8,873,164 B2
(45) Date of Patent: Oct. 28, 2014

(54) PHOTOGRAPHIC LENS OPTICAL SYSTEM

(75) Inventors: Chi Ho An, Seongnam-si (KR); Pil Sun Jung, Seongnam-si (KR); Jae Hoon Cho, Seongnam-si (KR); Ji Eun Kim, Seongnam-si (KR); Chan Goo Kang, Seongnam-si (KR)

(73) Assignee: Kolen Co., Ltd. (KR)

( * ) Notice: Subject to any disclaimer, the term of this patent is extended or adjusted under 35 U.S.C. 154(b) by 154 days.

(21) Appl. No.: 13/588,613

(22) Filed: Aug. 17, 2012

(65) Prior Publication Data
US 2013/0242411 A1 Sep. 19, 2013

(30) Foreign Application Priority Data
Mar. 19, 2012 (KR) .......................... 10-2012-0027752

(51) Int. Cl.
*G02B 3/02* (2006.01)
*G02B 13/18* (2006.01)

(52) U.S. Cl.
USPC ............ 359/714; 359/740; 359/763; 359/764

(58) Field of Classification Search
USPC .................. 359/714, 740, 763, 764
See application file for complete search history.

(56) References Cited

U.S. PATENT DOCUMENTS

| | | | | |
|---|---|---|---|---|
| 2011/0164327 | A1* | 7/2011 | Sato | 359/714 |
| 2013/0100545 | A1* | 4/2013 | Jo | 359/764 |
| 2014/0063596 | A1* | 3/2014 | Jung et al. | 359/714 |
| 2014/0063620 | A1* | 3/2014 | Jung et al. | 359/714 |

FOREIGN PATENT DOCUMENTS

| | | | |
|---|---|---|---|
| JP | 2011095513 A | 5/2011 | |
| KR | 20110024872 A | 3/2001 | |
| KR | 101089881 B1 | 12/2011 | |
| KR | 20120002073 A | 1/2012 | |

OTHER PUBLICATIONS

Office Action from the Korean Industrial Property Office, Application No. 119990546341, Issued: Jun. 27, 2013, 10 pages.

\* cited by examiner

*Primary Examiner* — Evelyn A. Lester
(74) *Attorney, Agent, or Firm* — St. Onge Steward Johnston & Reens LLC (57) ABSTRACT

A lens optical system includes first, second, third, fourth, and fifth lenses that are arranged between an object and an image sensor where an image of the object is formed, in order from an object side, wherein the first lens has a positive (+) refractive power and an incident surface that is convex toward the object, the second lens has a negative (−) refractive power and a meniscus shape that is convex toward the object, the third lens has a positive (+) refractive power and both convex surfaces, the fourth lens has a positive (+) refractive power and a meniscus shape that is convex toward the image sensor, and the fifth lens has a negative (−) refractive power and an incident surface and an exit surface, at least one of the incident surface and the exit surface is an aspherical surface.

20 Claims, 6 Drawing Sheets

PHOTOGRAPHIC LENS OPTICAL SYSTEM

CROSS-REFERENCE TO RELATED APPLICATIONS

This application claims the benefit of Korean Patent Application No. 10-2012-0027752, filed on Mar. 19, 2012, in the Korean Intellectual Property Office, the disclosure of which is incorporated herein in its entirety by reference.

FIELD OF THE INVENTION

The present invention relates to an optical apparatus, and more particularly, to a lens optical system adopted in a camera.

BACKGROUND OF THE INVENTION

Cameras using a solid state image sensor such as a charge coupled device (CCD) and a complementary metal oxide semiconductor (CMOS) image sensor have been rapidly distributed. To increase resolution of a camera, a degree of pixel integration of a solid state image sensor is increased. Also, the size and weight of a camera is being reduced through improvement of performance of a lens optical system included in a camera.

In general, a lens optical system of a compact camera uses a lot of lenses including one or more glass lenses to secure performance of the lens optical system. However, in case of a glass lens, a manufacturing cost is relatively high and conditions for forming/processing are restricted, so that it may be difficult to make a compact lens optical system.

Accordingly, there is a demand to develop a lens optical system capable of addressing the above issue. In other words, a lens optical system capable of exhibiting superior performance and high resolution and being made compact and lightweight needs to be developed.

SUMMARY OF THE INVENTION

The present invention provides a lens optical system that is compact and lightweight and exhibits superior performance and high resolution.

According to an aspect of the present invention, a lens optical system includes first, second, third, fourth, and fifth lenses that are arranged between an object and an image sensor where an image of the object is formed, in order from an object side, wherein the first lens has a positive (+) refractive power and an incident surface that is convex toward the object, the second lens has a negative (−) refractive power and a meniscus shape that is convex toward the object, the third lens has a positive (+) refractive power and both convex surfaces, the fourth lens has a positive (+) refractive power and a meniscus shape that is convex toward the image sensor, and the fifth lens has a negative (−) refractive power and an incident surface and an exit surface, at least one of the incident surface and the exit surface is an aspherical surface.

A viewing angle θ of the lens optical system and a total length TTL of the lens optical system may satisfy the following inequality, $$0.5 < \tan\theta / TTL < 1.5.$$

A focal length f1 of the first lens and a focal length f of the lens optical system may satisfy the following inequality, $$0.5 < f1/f < 1.5.$$

A total length TTL of the lens optical system and a distance BL from the exit surface of the fifth lens to the image sensor may satisfy the following inequality, $$3.4 < TTL/BL < 4.0.$$

The lens optical system may satisfy at least two of the following inequalities:

$$0.5 < \tan\theta / TTL < 1.5,$$

$$0.5 < f1/f < 1.5, \text{ and}$$

$$3.4 < TTL/BL < 4.0,$$

wherein θ is a viewing angle of the lens optical system, TTL is a total length of the lens optical system, f1 is a focal length of the first lens, f is a focal length of the lens optical system, and BL is a distance from the exit surface of the fifth lens to the image sensor.

An exit surface of the first lens may be convex toward the image sensor.

An exit surface of the first lens may be concave toward the image sensor.

An incident surface of the third lens may be convex toward the object at around an optical axis and concave toward the object around an edge thereof.

An incident surface of the third lens may be convex toward the object as a whole.

At least one of the first to fourth lenses may be an aspherical lens.

At least one of the incident surface and the exit surface of the fifth lens may have at least one inflection point between a center portion and an edge thereof.

The incident surface of the fifth lens may be convex toward the object at the center portion and concave toward the object around the edge, and the exit surface of the fifth lens may be concave toward the image sensor at the center portion and convex toward the image sensor around the edge.

The lens optical system may further include an aperture between the object and the first lens.

The lens optical system may further include an infrared blocking unit between the fifth lens and the image sensor.

At least one of the first to fifth lenses may be a plastic lens.

According to an aspect of the present invention, a lens optical system includes first, second, third, fourth, and fifth lenses that are arranged between an object and an image sensor where an image of the object is formed, in order from an object side, wherein the first, second, third, fourth, and fifth lenses have positive (+), negative (−), positive (+), positive (+), and negative (−) refractive powers, respectively, and a viewing angle θ of the lens optical system and a total length TTL of the lens optical system satisfy the following inequality, $$0.5 < \tan\theta / TTL < 1.5.$$

A focal length f1 of the first lens and a focal length f of the lens optical system satisfy the following inequality, $$0.5 < f1/f < 1.5.$$

A total length TTL of the lens optical system and a distance BL from an exit surface of the fifth lens to the image sensor may satisfy the following inequality, $$3.4 < TTL/BL < 4.0.$$

A total length TTL of the lens optical system and a distance BL from an exit surface of the fifth lens to the image sensor may satisfy the following inequality, $$3.4 < TTL/BL < 4.0.$$

The first lens may be convex toward the object, the second lens may be convex toward the object, the third lens may be a biconvex lens, the fourth lens may be convex toward the image sensor, and the fifth lens may be an aspherical lens.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 1:
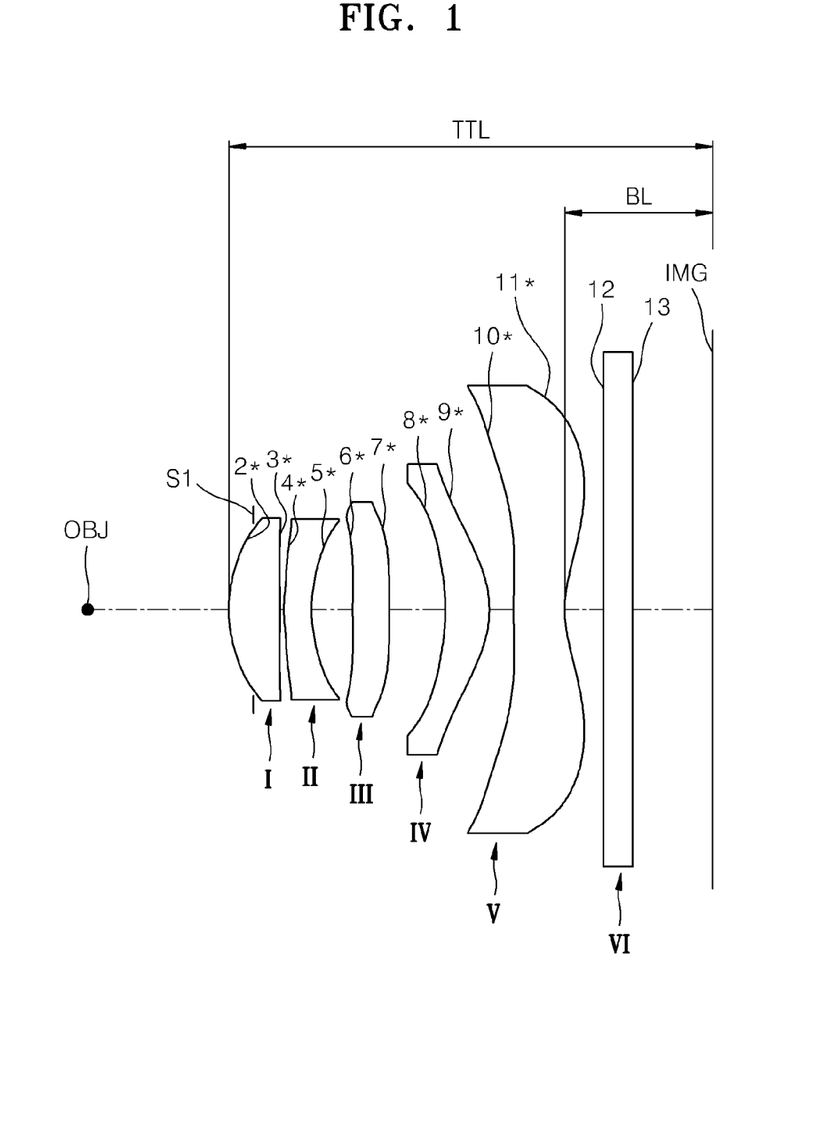
FIGS. 1 through 3 are cross-sectional views illustrating an arrangement of main elements of each of lens optical systems according to first through third embodiments of the present invention.
Figure 2:
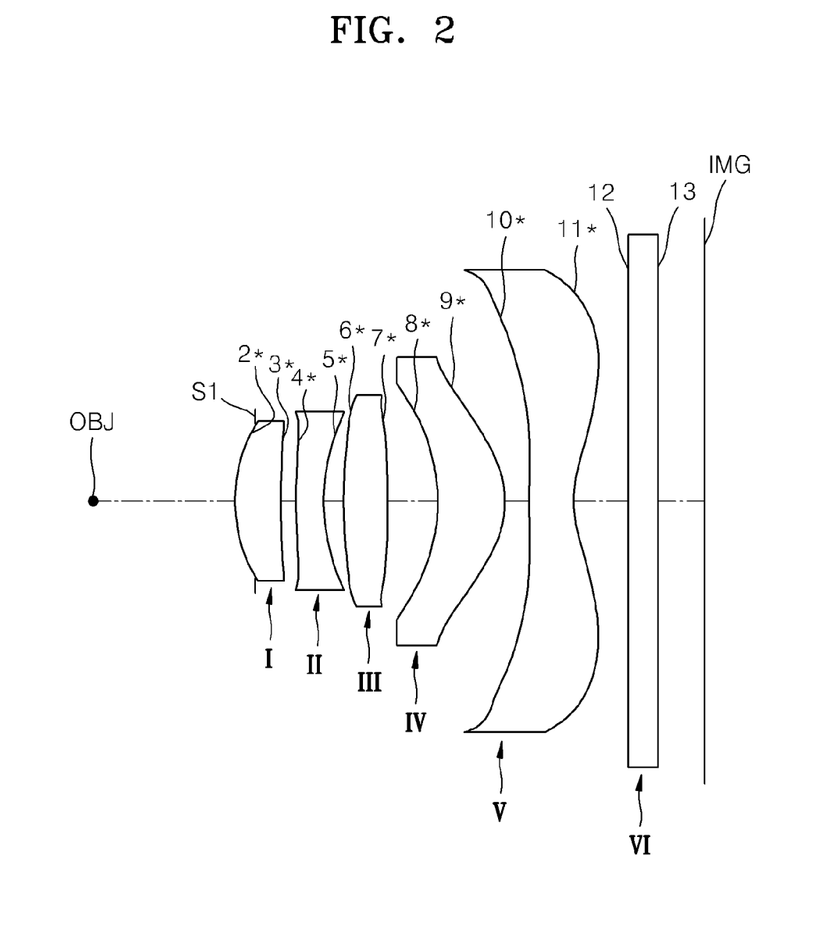
Figure 3:
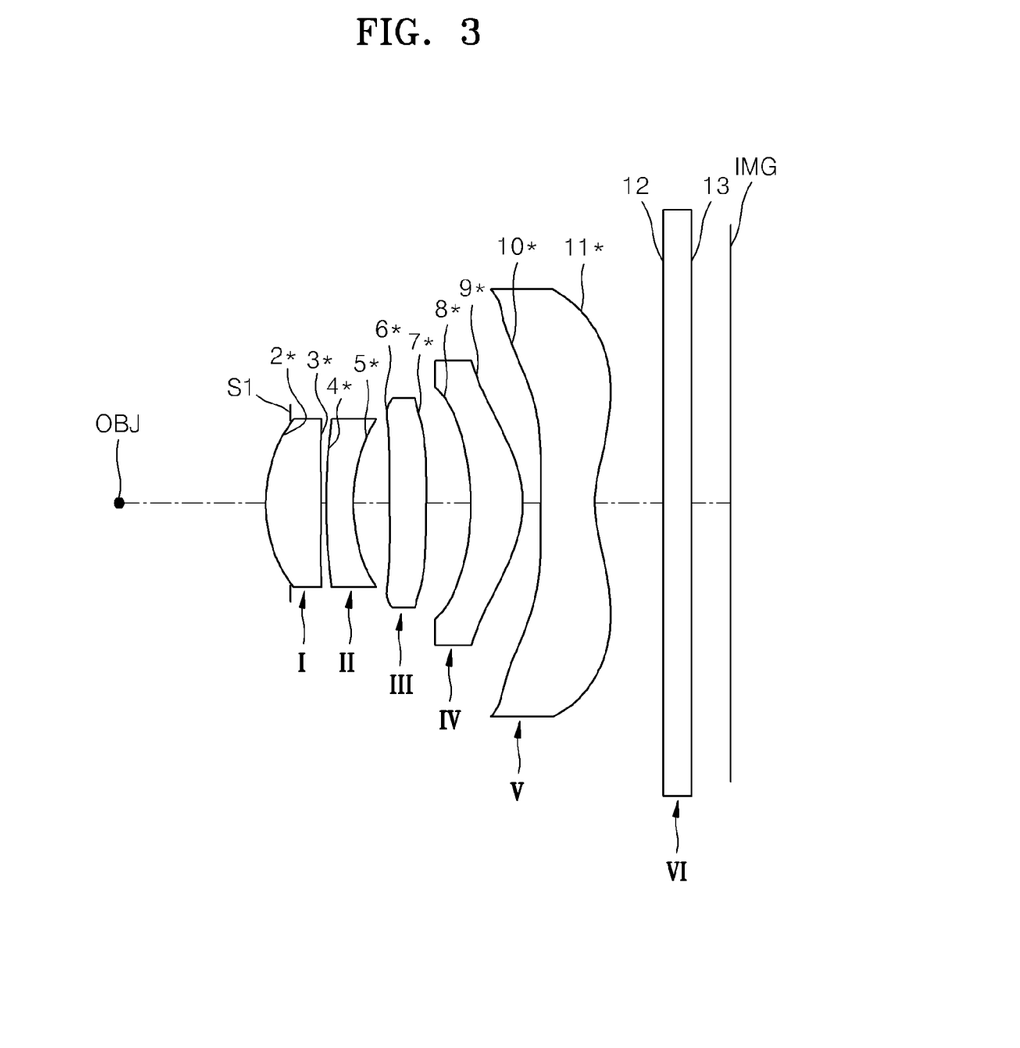

FIGS. 1 through 3 are sectional views illustrating an arrangement of main elements of lens optical systems according to first through third embodiments of the present invention.

Referring to FIGS. 1 through 3, each of the lens optical systems according to embodiments of the present invention may include a first lens I, a second lens II, a third lens III, a fourth lens IV, and a fifth lens V that are arranged between an object OBJ and an image sensor IMG where an image of the object OBJ is formed, in order from a side of the object OBJ. The first lens I may have a positive (+) refractive power and be convex toward the object OBJ. An incident surface 2* of the first lens I may be convex toward the object OBJ, whereas an exit surface 3* of the first lens I may be convex or concave toward the image sensor IMG. In the embodiments of FIGS. 1 and 3, the exit surface 3* of the first lens I is convex toward the image sensor IMG. In the embodiment of FIG. 2, the exit surface 3* of the first lens I is concave toward the image sensor IMG. Thus, in the embodiments of FIGS. 1 and 3, both surfaces, that is, the incident surface 2* and the exit surface 3*, of the first lens I may be convex. In the embodiment of FIG. 2, the first lens I may be a meniscus lens that is convex toward the object OBJ. The second lens II may have a negative (−) refractive power and be a meniscus lens that is convex toward the object OBJ.

The third lens III may have a positive (+) refractive power and be a lens whose both surfaces, that is, an incident surface 6* and an exit surface 7*, are convex. The convexity of both surfaces of the third lens III signifies that the incident surface 6* and the exit surface 7* are convex to both sides at and/or around an optical axis. In other words, the incident surface 6* of the third lens III may be convex toward the object OBJ at around the optical axis, that is, at a center portion, whereas the exit surface 7* of the third lens III may be convex toward the image sensor IMG at around the optical axis, that is, at the center portion. In this regard, the third lens III may be a biconvex lens. In the embodiments of FIGS. 1 and 3, the incident surface 6* of the third lens III may be convex toward the object OBJ at around the optical axis and concave toward the object OBJ around an edge thereof. In the embodiment of FIG. 2, the incident surface 6* of the third lens III may be convex toward the object OBJ as a whole.

The fourth lens IV may have a positive (+) refractive power and be a meniscus lens that is convex toward the image sensor IMG. At least one of the first to fourth lenses I-IV may be an aspherical lens. In other words, at least one of the incident surface 2*, 4*, 6*, or 8* and the exit surface 3*, 5*, 7*, or 9* of at least one of the first to fourth lenses I-IV may be aspherical. For example, all incident surfaces 2*, 4*, 6*, and 8* and the exit surfaces 3*, 5*, 7*, and 9* of the first to fourth lenses I-IV may be aspherical.

The fifth lens V may have a negative (−) refractive power and at least one of an incident surface 10* and an exit surface 11* of the fifth lens V may be an aspherical surface. For example, at least one of the incident surface 10* and the exit surface 11* of the fifth lens V may be an aspherical surface having at least one inflection point between a center portion and an edge thereof. The incident surface 10* of the fifth lens V may be convex toward the object OBJ at the center portion and concave toward the OBJ around the edge. The exit surface 11* of the fifth lens V may be concave toward the image sensor IMG at the center portion and convex toward the image sensor IMG around the edge. The first lens I may have a relatively strong positive (+) refractive power and the second to fifth lenses II to V may serve as aberration correction lenses.

Each of the lens optical systems according to embodiments of the present invention may further include an aperture S1 and an infrared blocking unit VI. The aperture S1 may be provided at a side of the first lens I toward the object OBJ, that is, between the object OBJ and the first lens I. The infrared blocking unit VI may be provided between the fifth lens V and the image sensor IMG. The infrared blocking unit VI may be an infrared blocking filter. The locations of the aperture S1 and the infrared blocking unit VI may vary.

The lens optical systems according to embodiments of the present invention configured as above may satisfy at least one of Inequalities 1 to 3.

$$0.5 < \tan\theta/TTL < 1.5 \quad \text{[Inequality 1]}$$

Here, "θ" is a viewing angle of a lens optical system and "TTL" is a total length of a lens optical system. The total length "TTL" of the lens optical system is a distance from the incident surface 2* of the first lens I to the image sensor IMG. The "TTL" is a length on an optical axis.

Inequality 1 shows a condition for making a lens optical system compact. Also, Inequality 1 is related to a viewing angle of the lens optical system and correction of spherical aberration. When "tan θ/TTL" is greater than or equal to an upper limit of 1.5 in Inequality 1, although miniaturization of a lens optical system is facilitated, various aberrations such as spherical aberration may be increased. In contrast, when the "tan θ/TTL" is less than or equal to a lower limit of 0.5, although correction of spherical aberration is facilitated, the total length of a lens optical system increases and thus miniaturization of a lens optical system may be difficult. When the condition of Inequality 1 is satisfied, a lens optical system may be made compact while maintaining spherical aberration in a good state. Also, when Inequality 1 is satisfied, the lens optical system may have a compact size and appropriate viewing angle.

$$0.5 < f1/f < 1.5 \quad \text{[Inequality 2]}$$

Here, "f1" is a focal length of the first lens I and "f" is a focal length of the whole lens optical system.

Inequality 2 shows a condition for reducing spherical aberration of a lens optical system. Also, Inequality 2 is related to miniaturization of a lens optical system. When "f1/f" is less than or equal to a lower limit of 0.5 in Inequality 2, although correction of spherical aberration is facilitated, miniaturization of a lens optical system may be difficult. In contrast, when the "f1/f" is greater than or equal to an upper limit of 1.5, although the miniaturization of a lens optical system is facilitated, spherical aberration may be increased. When the condition of Inequality 2 is satisfied, a lens optical system may be made compact while maintaining spherical aberration in a good state.

$$3.4 < TTL/BL < 4.0 \quad \text{[Inequality 3]}$$

Here, "TTL" is a total length of the lens optical system and "BL" is a distance from the exit surface 11* of the fifth lens V to the image sensor IMG. The total length "TTL" of the lens optical system signifies a distance from the incident surface 2* of the first lens I to the image sensor IMG. The "TTL" and "BL" are lengths on the optical axis.

Inequality 3 shows a condition for miniaturization of a lens optical system. In Inequality 3, as the "TTL/BL" approaches an upper limit of 4.0, miniaturization of a lens optical system is facilitated. Since a rate of a decrease of the "BL" being decreased is greater than a rate of a decrease of the "TTL", as a lens optical system is made slim, the "TTL/BL" may approach the upper limit of 4.0. However, when the "TTL/BL" is greater than or equal to the upper limit of 4.0, various aberrations such as spherical aberration may be increased. In contrast, when the "TTL/BL" is less than or equal to a lower limit of 3.4, although correction of aberration is facilitated, the total length of a lens optical system increases and thus miniaturization of a lens optical system may be difficult. Thus, setting the "TTL/BL" within the above range would be advantageous for the miniaturization of a lens optical system and the correction of aberration.

In the above-described embodiments of FIGS. 1 through 3 (i.e., the first through third embodiments), the values of Inequalities 1 through 3 are shown in Tables 1 through 3. In Table 1, the unit of a viewing angle θ is a degree (°). In Tables 1 and 3, the units of the "TTL", "BL", and the focal lengths "f1" and "f" are millimeters (mm).

TABLE 1

|  | θ | TTL | Inequality 1 (0.5 < tanθ/TTL < 1.5) |
|---|---|---|---|
| 1st Embodiment | 68.39 | 4.79 | 0.52 |
| 2nd Embodiment | 72.87 | 4.78 | 0.68 |
| 3rd Embodiment | 68.00 | 4.78 | 0.52 |

TABLE 2

|  | f1 | f | Inequality 2 (0.5 < f1/f < 1.5) |
|---|---|---|---|
| 1st Embodiment | 2.6419 | 4.1570 | 0.64 |
| 2nd Embodiment | 3.2643 | 3.8636 | 0.84 |
| 3rd Embodiment | 2.5621 | 4.1818 | 0.61 |

TABLE 3

|  | TTL | BL | Inequality 3 (3.4 < TTL/BL < 4.0) |
|---|---|---|---|
| 1st Embodiment | 4.79 | 1.34 | 3.57 |
| 2nd Embodiment | 4.78 | 1.34 | 3.56 |
| 3rd Embodiment | 4.78 | 1.40 | 3.41 |

Referring to Tables 1 through 3, the lens optical systems of the above embodiments of FIGS. 1 through 3 may satisfy Inequalities 1 through 3.

In the lens optical systems according to the above-described embodiments configured as above, the first to fifth lenses I-V may be formed of plastic in consideration of the shapes and dimensions thereof. In other words, all of the first to fifth lenses I-V may be plastic lenses. In case of a glass lens, a manufacturing cost is high and conditions for forming/processing are restricted, so that it may be difficult to make a compact lens optical system. In the present invention, however, since all of the first to fifth lenses I-V may be formed of plastic, a variety of advantages according thereto may be obtained. Nevertheless, the materials of the first to fifth lenses I-V of the present invention are not limited to plastic. If necessary, at least one of the first to fifth lenses I-V may be formed of glass.

The lens optical systems according to the above-described embodiments of the present invention will be described in detail with reference to lens data and the attached drawings.

Tables 4 through 6 each shows curvature radiuses, thicknesses or distances between lenses, refractive indexes, and Abbe numbers of lenses constituting the lens optical systems of FIGS. 1 through 3. In Tables 4 through 6, "R" denotes a curvature radius, "D" denotes a thickness of a lens or an interval or distance between neighboring constituent elements, "Nd" denotes a refractive index of a lens measured by using a d-line, and "Vd" denotes an Abbe number with respect to the d-line. With respect to a lens surface number, the mark * denotes that a lens surface is aspherical. The units of "R" and "D" values are millimeters (mm).

TABLE 4

| 1st Embodiment | Surface | R | D | Nd | Vd |
|---|---|---|---|---|---|
|  | S1 | — | — |  |  |
| I | 2* | 1.5524 | 0.5266 | 1.53 | 55.86 |
|  | 3* | −13.4955 | 0.0451 |  |  |
| II | 4* | 4.7188 | 0.2800 | 1.64 | 23.52 |
|  | 5* | 1.5726 | 0.4259 |  |  |
| III | 6* | 34.8512 | 0.3724 | 1.53 | 55.86 |
|  | 7* | −18.5921 | 0.5755 |  |  |
| IV | 8* | −2.3076 | 0.4500 | 1.53 | 55.86 |
|  | 9* | −1.0649 | 0.2520 |  |  |
| V | 10* | 6.7803 | 0.5240 | 1.53 | 55.86 |
|  | 11* | 1.1848 | 0.4000 |  |  |
| VI | 12 |  | 0.3000 | 1.53 | 39.07 |
|  | 13 |  | 0.6450 |  |  |
|  | IMG | Infinity |  |  |  |

TABLE 5

| 2nd Embodiment | Surface | R | D | Nd | Vd |
|---|---|---|---|---|---|
|  | S1 | — | — |  |  |
| I | 2* | 1.5952 | 0.4678 | 1.55 | 56.09 |
|  | 3* | 13.6355 | 0.1525 |  |  |

TABLE 5-continued

| 2nd Embodiment | Surface | R | D | Nd | Vd |
|---|---|---|---|---|---|
| II | 4* | 5.2690 | 0.2800 | 1.64 | 23.89 |
|  | 5* | 1.7738 | 0.2061 |  |  |
| III | 6* | 4.9754 | 0.4444 | 1.53 | 55.86 |
|  | 7* | −11.2789 | 0.5109 |  |  |
| IV | 8* | −1.7531 | 0.6857 | 1.55 | 56.09 |
|  | 9* | −0.8777 | 0.2427 |  |  |
| V | 10* | 8.3677 | 0.4500 | 1.53 | 55.86 |
|  | 11* | 0.9955 | 0.5618 |  |  |
| VI | 12 |  | 0.3000 | 1.53 | 39.07 |
|  | 13 |  | 0.4692 |  |  |
|  | IMG | Infinity |  |  |  |

TABLE 6

| 3rd Embodiment | Surface | R | D | Nd | Vd |
|---|---|---|---|---|---|
|  | S1 | — | — |  |  |
| I | 2* | 1.4819 | 0.5698 | 1.53 | 55.86 |
|  | 3* | −15.2589 | 0.0513 |  |  |
| II | 4* | 6.4801 | 0.2800 | 1.64 | 23.52 |
|  | 5* | 1.7236 | 0.3703 |  |  |
| III | 6* | 16.5313 | 0.3787 | 1.53 | 55.86 |
|  | 7* | −24.5442 | 0.4601 |  |  |
| IV | 8* | −2.1096 | 0.5301 | 1.53 | 55.86 |
|  | 9* | −1.0879 | 0.1829 |  |  |
| V | 10* | 8.1642 | 0.5602 | 1.53 | 55.86 |
|  | 11* | 1.2794 | 0.7000 |  |  |
| VI | 12 |  | 0.3000 | 1.53 | 39.07 |
|  | 13 |  | 0.3983 |  |  |
|  | IMG | Infinity |  |  |  |

Also, in the lens optical systems according to the first through third embodiments corresponding to FIGS. 1 through 3, an aspherical surface of each lens satisfies the following aspherical surface equation, that is, Equation 4.

$$x = \frac{c' y^2}{1 + \sqrt{1 - (K+1)c'^2 y^2}} + Ay^4 + By^6 + Cy^8 + Dy^{10} + Ey^{12} \quad \text{[Equation 4]}$$

In Equation 4, "x" denotes a distance from the apex of a lens in a direction along an optical axis, "y" denotes a distance in a direction perpendicular to the optical axis, "c'" denotes a reciprocal number (=1/r) of a curvature radius at the apex of a lens, "K" denotes a conic constant, and "A", "B", "C", "D", and "E" each denotes an aspherical surface coefficient.

Tables 7 through 9 each shows aspherical surface coefficients of aspherical surfaces of the lens optical systems according to the first through third embodiments corresponding to FIGS. 1 through 3. In other words, Tables 7 through 9 each shows aspherical coefficients of the incident surfaces 2*, 4*, 6*, 8*, and 10* and the exit surfaces 3*, 5*, 7*, 9*, and 11* of each lens of Tables 4 through 6.

TABLE 7

| Surface | K | A | B | C | D | E |
|---|---|---|---|---|---|---|
| 2* | −0.0030 | 0.0113 | 0.0054 | −0.0129 | 0.0511 | −0.0302 |
| 3* | 0.0000 | 0.0869 | −0.0262 | −0.0029 | 0.0242 | −0.0461 |
| 4* | 0.0000 | −0.0435 | 0.1317 | −0.1401 | 0.0370 | −0.0334 |
| 5* | −2.9713 | −0.0397 | 0.1913 | −0.0905 | −0.0386 | 0.0670 |
| 6* | 0.0000 | −0.1186 | −0.0422 | 0.0352 | 0.0111 | 0.0389 |
| 7* | 0.0000 | −0.0863 | −0.0574 | 0.0100 | 0.0030 | 0.0176 |
| 8* | −10.9175 | −0.0332 | 0.0440 | −0.0731 | 0.0279 | −0.0059 |
| 9* | −1.7626 | 0.0959 | −0.0458 | 0.0280 | −0.0115 | 0.0031 |
| 10* | −612.1285 | −0.1033 | 0.0384 | −0.0041 | −0.0005 | −2.2487e−005 |
| 11* | −8.117 | −0.0853 | 0.0305 | −0.0085 | 0.0012 | −4.5484e−005 |

TABLE 8

| Surface | K | A | B | C | D | E |
|---|---|---|---|---|---|---|
| 2* | 0.0709 | 0.0109 | 0.0143 | −0.0021 | 0.0354 | −0.0377 |
| 3* | 0.0000 | 0.0075 | 0.0528 | −0.0873 | 0.0734 | −0.0977 |
| 4* | −117.1088 | −0.0292 | 0.0503 | −0.1148 | −0.0190 | −0.0101 |
| 5* | −5.3198 | −0.0223 | 0.1587 | −0.1334 | −0.0281 | 0.0642 |
| 6* | 0.0000 | −0.0561 | −0.0034 | 0.0583 | 0.0078 | −0.0126 |
| 7* | 25.8610 | −0.0171 | −0.0329 | 0.0057 | −0.0039 | 0.0288 |
| 8* | −4.9890 | −0.1015 | 0.0774 | −0.0832 | 0.0399 | −0.0025 |
| 9* | −2.4090 | −0.0203 | −0.0294 | 0.0388 | −0.0109 | 0.0025 |
| 10* | −1422.9590 | −0.0778 | 0.0258 | −0.0030 | −0.0003 | 7.2866e−007 |
| 11* | −7.2596 | −0.0797 | 0.0304 | −0.0087 | 0.0013 | −6.7117e−005 |

TABLE 9

| Surface | K | A | B | C | D | E |
|---|---|---|---|---|---|---|
| 2* | −0.0233 | 0.0074 | 0.0084 | −0.0198 | 0.0587 | −0.0408 |
| 3* | 0.0000 | 0.0798 | −0.0135 | −0.0277 | 0.0142 | −0.0366 |
| 4* | 0.0000 | −0.0156 | 0.1088 | −0.1333 | 0.0065 | −0.0039 |
| 5* | −2.0044 | −0.0385 | 0.1779 | −0.0691 | −0.0570 | 0.0923 |
| 6* | 0.0000 | −0.1039 | −0.0185 | 0.0296 | 0.0229 | 0.0253 |
| 7* | 0.0000 | −0.0609 | −0.0496 | 0.0092 | −0.0036 | 0.0235 |
| 8* | −13.3771 | −0.0560 | 0.0488 | −0.0758 | 0.0238 | −0.0062 |
| 9* | −2.3617 | 0.0516 | −0.0406 | 0.0309 | −0.0112 | 0.0031 |
| 10* | −1042.0649 | −0.1240 | 0.0384 | −0.0028 | −0.0004 | −2.4747e−005 |
| 11* | −9.5534 | −0.0897 | 0.0294 | −0.0081 | 0.0012 | −4.5181e−005 |

Figure 4:
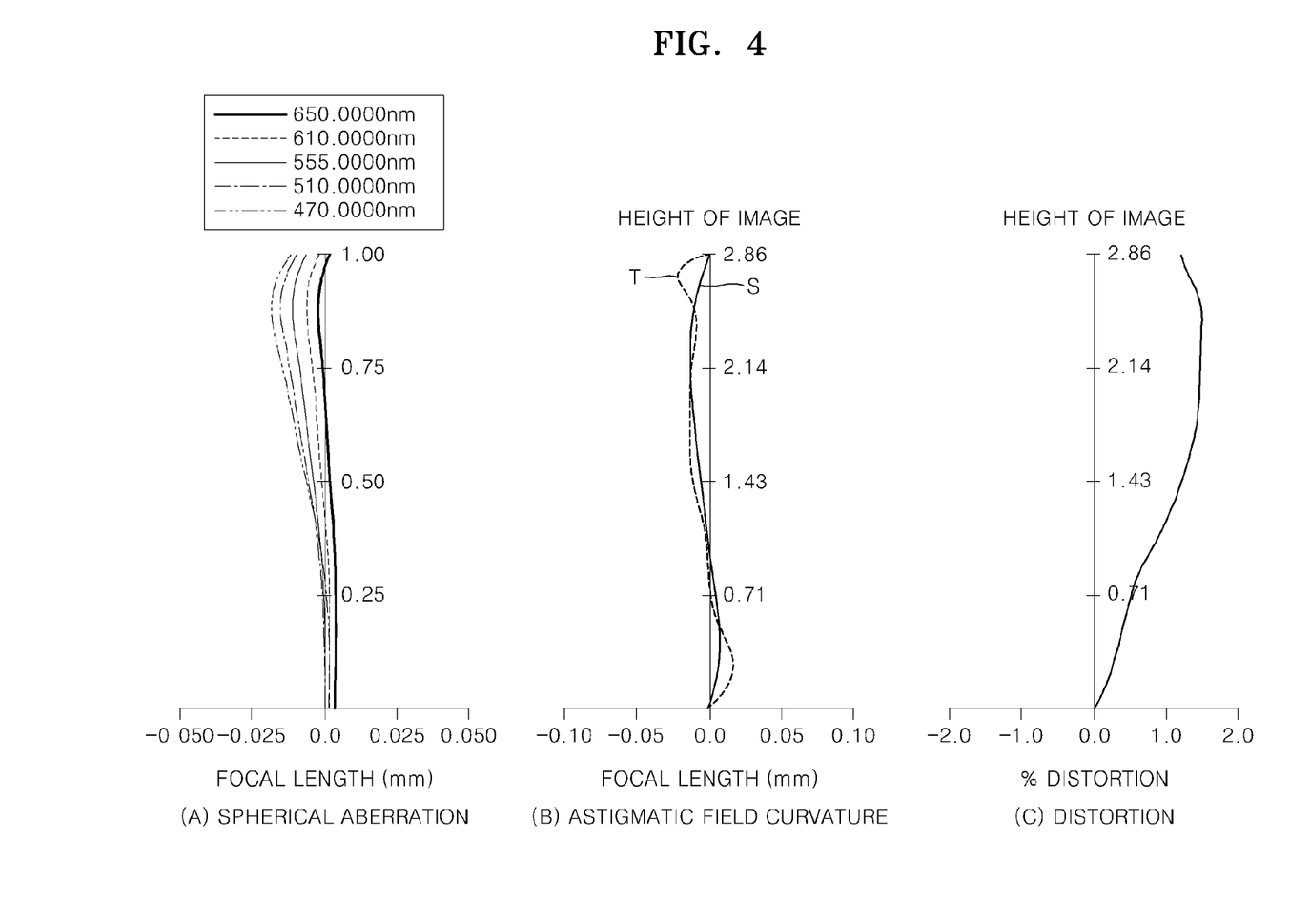
FIGS. 4A, 4B, and 4C are aberration diagrams respectively illustrating longitudinal spherical aberration, astigmatic field curvature, and distortion of the lens optical system of FIG. 1.
Figure 5:
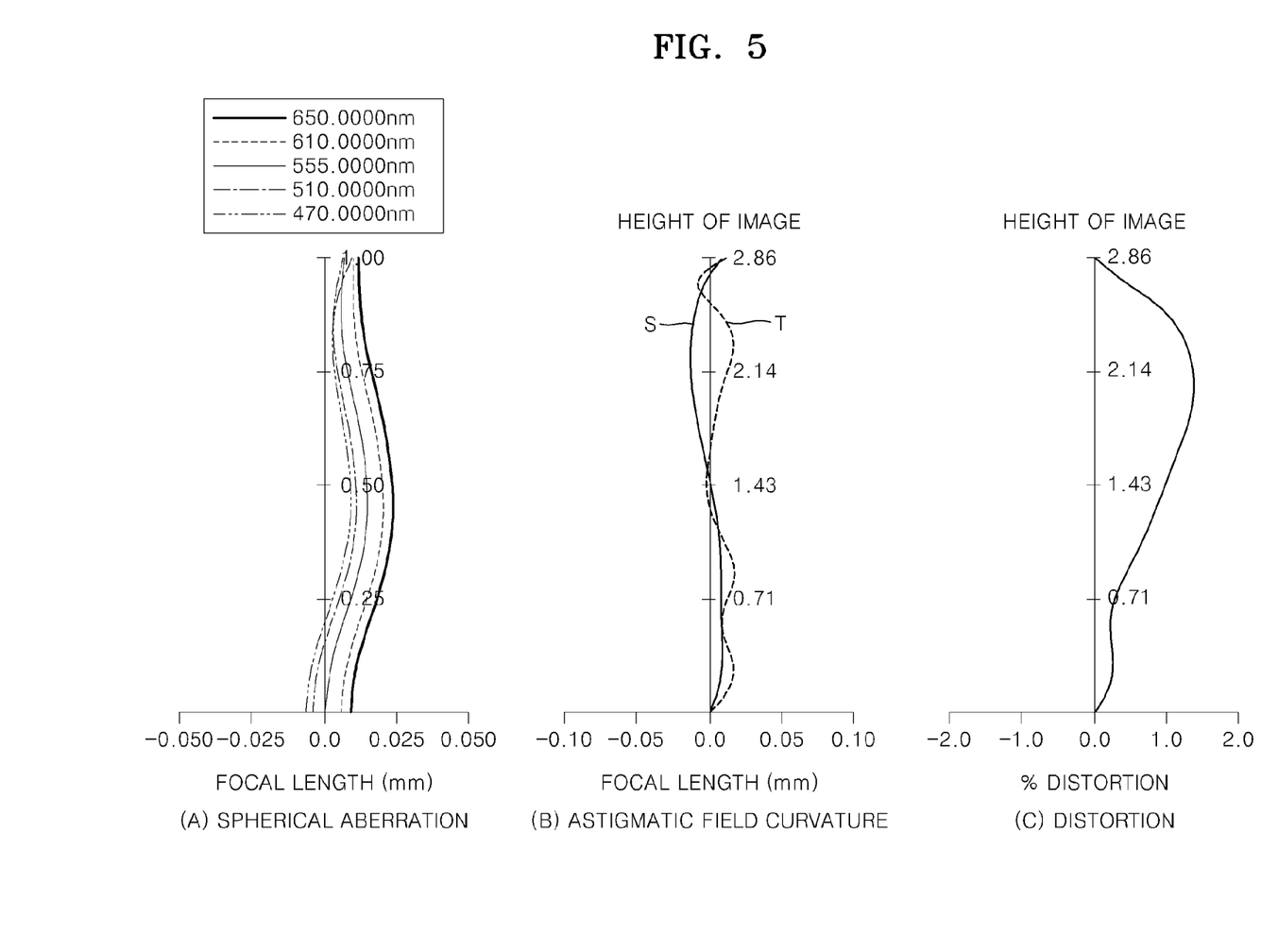
FIGS. 5A, 5B, and 5C are aberration diagrams respectively illustrating longitudinal spherical aberration, astigmatic field curvature, and distortion of the lens optical system of FIG. 2.
Figure 6:
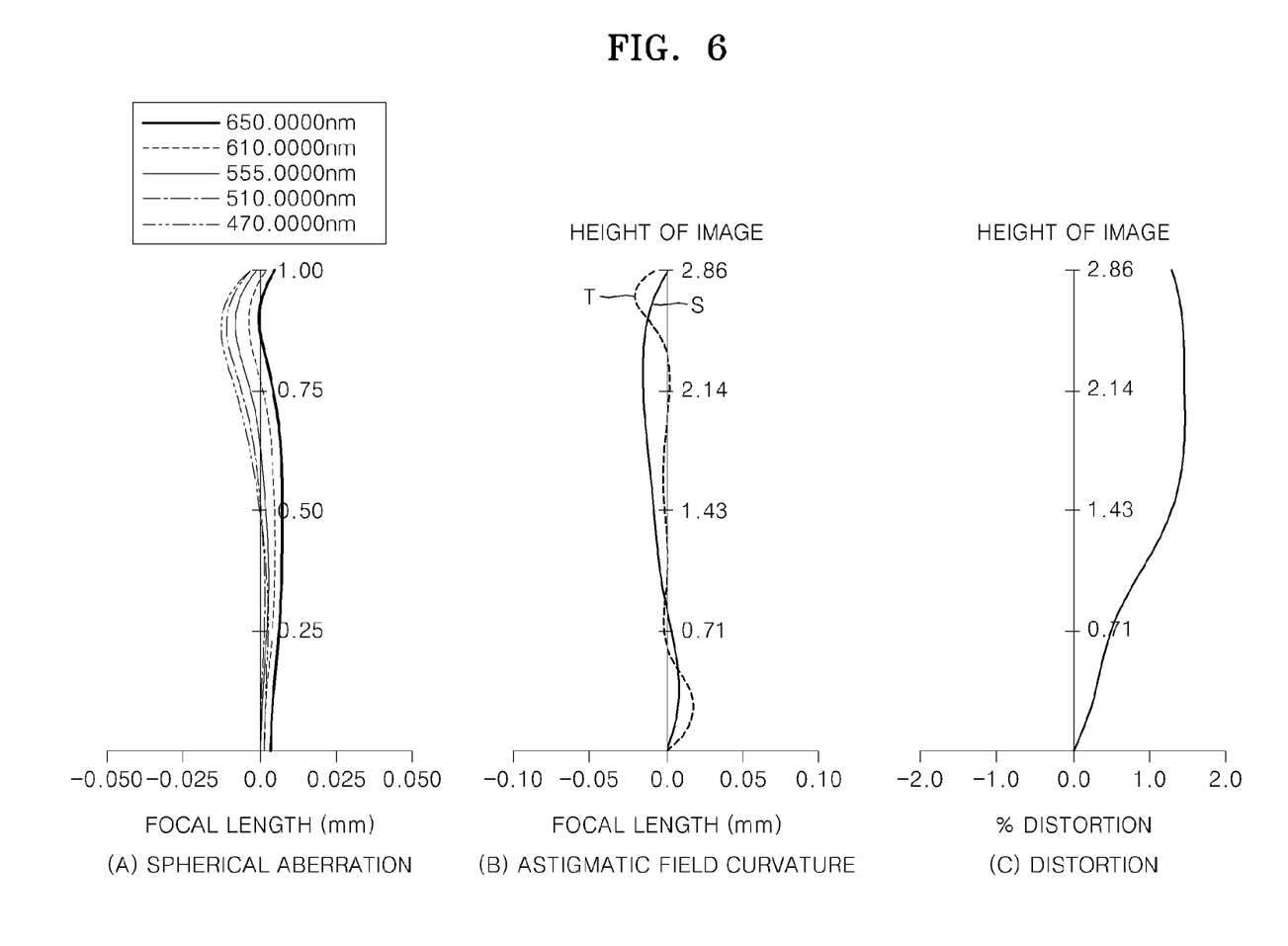
FIGS. 6A, 6B, and 6C are aberration diagrams respectively illustrating longitudinal spherical aberration, astigmatic field curvature, and distortion of the lens optical system of FIG. 3.

FIGS. 4A, 4B, and 4C are aberration diagrams respectively illustrating longitudinal spherical aberration, astigmatic field curvature, and distortion of the lens optical system of FIG. 1, that is, the lens optical system having the values of Table 4. FIG. 4A illustrates spherical aberration of the lens optical system with respect to lights of various wavelengths. FIG. 4B illustrates astigmatic field curvature of the lens optical system, that is, a tangential field curvature T and a sagittal field curvature S. The wavelengths of light used to obtain data of FIG. 4A are 650.0000 nm, 610.0000 nm, 555.0000 nm, 510.0000 nm, and 470.0000 nm. The wavelength of light used to obtain data of FIGS. 4B and 4C is 555.0000 nm. The same conditions are applied to the lens optical systems of FIGS. 5 and 6.

FIGS. 5A, 5B, and 5C are aberration diagrams respectively illustrating longitudinal spherical aberration, astigmatic field curvature, and distortion of the lens optical system of FIG. 2, that is, the lens optical system having the values of Table 5.

FIGS. 6A, 6B, and 6C are aberration diagrams respectively illustrating longitudinal spherical aberration, astigmatic field curvature, and distortion of the lens optical system of FIG. 3, that is, the lens optical system having the values of Table 6.

As described above, the lens optical systems according to embodiments of the present invention each may include the first to fifth lenses I-V respectively having positive (+), negative (−), positive (+), positive (+), and negative (−) refractive powers that are arranged in order from the object OBJ side toward the image sensor IMG side, and may satisfy at least any one of Inequalities 1 to 3. The lens optical system may have a relatively short total length, and may easily (well) correct various aberrations. Thus, according to the present invention, a lens optical system that is compact and lightweight and has superior performance and high resolution may be embodied.

In particular, in the lens optical systems according to the embodiments of the present invention, when at least one of the incident surface 10* and the exit surface 11* of the fifth lens V is an aspherical surface having at least one inflection point between a center portion and an edge thereof, various aberrations may be easily corrected by using the fifth lens V and vignetting may be prevented by decreasing an exit angle of a chief ray.

Also, as described above, since the first to fifth lenses I-V may be formed of plastic and at least one of two surfaces, that is, an incident surface and an exit surface, of each lens may be formed as an aspherical surface, a lens optical system that is compact and has superior performance may be embodied at low cost compared to a case of using a glass lens.

While this invention has been particularly shown and described with reference to exemplary embodiments thereof, it will be understood by those skilled in the art that various changes in form and details may be made therein without departing from the spirit and scope of the invention as defined by the appended claims. For example, it can be seen that those skilled in the art may use a blocking film instead of a filter, as the infrared blocking unit VI. Also, the positions of the infrared blocking unit VI and the aperture S1 may be changed. Therefore, the scope of the invention is defined not by the detailed description of the invention but by the appended claims.

What is claimed is:

1. A lens optical system comprising first, second, third, fourth, and fifth lenses that are arranged between an object and an image sensor where an image of the object is formed, in order from an object side, wherein the first lens has a positive (+) refractive power and an incident surface that is convex toward the object, the second lens has a negative (−) refractive power and a meniscus shape that is convex toward the object, the third lens has a positive (+) refractive power and both convex surfaces, the fourth lens has a positive (+) refractive power and a meniscus shape that is convex toward the image sensor, and the fifth lens has a negative (−) refractive power and an incident surface and an exit surface, at least one of the incident surface and the exit surface is an aspherical surface, wherein a viewing angle θ of the lens optical system and a total length TTL of the lens optical system satisfy the following inequality, $$0.5 < \tan\theta/TTL < 1.5.$$

2. The lens optical system of claim 1, wherein a focal length f1 of the first lens and a focal length f of the lens optical system satisfy the following inequality, $$0.5 < f1/f < 1.5.$$

3. The lens optical system of claim 1, wherein a total length TTL of the lens optical system and a distance BL from the exit surface of the fifth lens to the image sensor satisfy the following inequality, $$3.4 < TTL/BL < 4.0.$$

4. The lens optical system of claim 1, satisfying the following inequalities:

$$0.5 < f1/f < 1.5, \text{ and}$$

$$3.4 < TTL/BL < 4.0,$$

wherein f1 is a focal length of the first lens, f is a focal length of the lens optical system, TTL is the total length of the lens optical system and BL is a distance from the exit surface of the fifth lens to the image sensor.

5. The lens optical system of claim 1, wherein an exit surface of the first lens is convex toward the image sensor.

6. The lens optical system of claim 1, wherein an exit surface of the first lens is concave toward the image sensor.

7. The lens optical system of claim 1, wherein an incident surface of the third lens is convex toward the object at around an optical axis and concave toward the object around an edge thereof.

8. The lens optical system of claim 1, wherein an incident surface of the third lens is convex toward the object as a whole.

9. The lens optical system of claim 1, wherein at least one of the first to fourth lenses is an aspherical lens.

10. The lens optical system of claim 1, wherein at least one of the incident surface and the exit surface of the fifth lens has at least one inflection point between a center portion and an edge thereof.

11. The lens optical system of claim 10, wherein the incident surface of the fifth lens is convex toward the object at the center portion and concave toward the object around the edge, and the exit surface of the fifth lens is concave toward the image sensor at the center portion and convex toward the image sensor around the edge.

12. The lens optical system of claim 1, further comprising an aperture between the object and the first lens.

13. The lens optical system of claim 1, further comprising an infrared blocking unit between the fifth lens and the image sensor.

14. The lens optical system of claim 1, wherein at least one of the first to fifth lenses is a plastic lens.

15. A lens optical system comprising first, second, third, fourth, and fifth lenses that are arranged between an object and an image sensor where an image of the object is formed, in order from an object side, wherein the first, second, third, fourth, and fifth lenses have positive (+), negative (−), positive (+), positive (+), and negative (−) refractive powers, respectively, and a viewing angle θ of the lens optical system and a total length TTL of the lens optical system satisfy the following inequality, $$0.5 < \tan \theta / TTL < 1.5.$$

16. The lens optical system of claim 15, wherein a focal length f1 of the first lens and a focal length f of the lens optical system satisfy the following inequality, $$0.5 < f1/f < 1.5.$$

17. The lens optical system of claim 16, wherein a total length TTL of the lens optical system and a distance BL from an exit surface of the fifth lens to the image sensor satisfy the following inequality, $$3.4 < TTL/BL < 4.0.$$

18. The lens optical system of claim 15, wherein a total length TTL of the lens optical system and a distance BL from an exit surface of the fifth lens to the image sensor satisfy the following inequality, $$3.4 < TTL/BL < 4.0.$$

19. The lens optical system of claim 15, wherein the first lens is convex toward the object, the second lens is convex toward the object, the third lens is a biconvex lens, the fourth lens is convex toward the image sensor, and the fifth lens is an aspherical lens.

20. A lens optical system comprising first, second, third, fourth, and fifth lenses that are arranged between an object and an image sensor where an image of the object is formed, in order from an object side, wherein the first lens has a positive (+) refractive power and an incident surface that is convex toward the object, the second lens has a negative (−) refractive power and a meniscus shape that is convex toward the object, the third lens has a positive (+) refractive power and both convex surfaces, the fourth lens has a positive (+) refractive power and a meniscus shape that is convex toward the image sensor, and the fifth lens has a negative (−) refractive power and an incident surface and an exit surface, at least one of the incident surface and the exit surface is an aspherical surface, wherein a total length TTL of the lens optical system and a distance BL from the exit surface of the fifth lens to the image sensor satisfy the following inequality, $$3.4 < TTL/BL < 4.0.$$

* * * * *